United States Patent
Piesing et al.

(10) Patent No.: US 7,493,011 B2
(45) Date of Patent: Feb. 17, 2009

(54) PLAYBACK OF APPLICATIONS WITH NON-LINEAR TIME

(75) Inventors: Jonathan R. Piesing, Croydon (GB); Sebastian A. F. A. Van den Heuvel, Eindhoven (NL); Leendert T. Rozendaal, Yalkenswaard (NL); Gerrit H. Soepenberg, Eindhoven (NL); Alexis S Ashley, Redhill (GB); Richard J Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1944 days.

(21) Appl. No.: 09/881,600

(22) Filed: Jun. 14, 2001

(65) Prior Publication Data

US 2002/0009290 A1 Jan. 24, 2002

(30) Foreign Application Priority Data

Jun. 30, 2000 (GB) .................................. 0016062.2

(51) Int. Cl.
*H04N 7/00* (2006.01)
(52) U.S. Cl. ..................... 386/46; 386/124; 725/32; 715/716
(58) Field of Classification Search .................. 386/46, 386/109, 123, 124; 380/211; 725/32; 715/716; 360/5; 709/219
See application file for complete search history.

(56) References Cited

U.S. PATENT DOCUMENTS

| | | | | | |
|---|---|---|---|---|---|
| 5,282,092 | A | * | 1/1994 | Wilhelms | 360/5 |
| 5,438,423 | A | * | 8/1995 | Lynch et al. | 386/109 |
| 5,448,568 | A | | 9/1995 | Delpuch et al. | 372/94.2 |
| 5,640,453 | A | * | 6/1997 | Schuchman et al. | 380/211 |
| 5,781,228 | A | * | 7/1998 | Sposato | 725/32 |
| 5,973,684 | A | * | 10/1999 | Brooks et al. | 715/716 |
| 5,995,705 | A | * | 11/1999 | Lang | 386/46 |
| 6,065,050 | A | * | 5/2000 | DeMoney | 709/219 |

FOREIGN PATENT DOCUMENTS

EP 0680213 A2 4/1995
WO WO9965230 12/1999

* cited by examiner

*Primary Examiner*—Thai Tran
*Assistant Examiner*—Mishawn Dunn

(57) ABSTRACT

A data playback apparatus and method for handling of a recorded data stream and associated linear application include a data stream playback stage operable to perform linear real-time and non-linear playback of a stored data stream from storage. An application processing stage runs a linear application from a given start point on commencement of linear real-time playback of the data stream. To avoid problems where the application is unsuited to the non-linearity, the application processing stage stops running of said application and, on recommencing of linear real-time playback, recommences running of the application from the given start point.

12 Claims, 2 Drawing Sheets

PLAYBACK OF APPLICATIONS WITH NON-LINEAR TIME

The present invention relates to methods and apparatus for the recording and playback of digital broadcast material and in particular to the playback of multimedia applications accompanying television broadcasts.

A broadcaster can broadcast multimedia platform-specific applications together with digital television programs, with a suitably equipped platform-specific set-top box receiving those applications and running them locally. Example applications are electronic program guides, play-along games, Tele-banking, Tele-shopping, electronic newspapers and similar information services. Television programs can be recorded and, if such a television program has an application associated with it, then that application should also be recorded. Typically multimedia platform-specific applications are broadcast in an object carousel, where all the application code and data is broadcast in cycles. This resembles teletext data, which is also broadcast in a carousel.

A suitable transmission system for such application delivery is known from ISO/IEC International Standard 13818-6, "MPEG-2 Digital Storage Media Command and Control" Jul. 12, 1996 (identified herein as DSM-CC). In modern digital broadcast systems a transmitter typically transmits a large number of services (or channels) to a plurality of receivers, examples of which are to be found in television sets or set-top boxes. Such a service can contain an audio/video stream, an interactive application (for example in the MHEG-5 format), other kinds of data or a combination of these elements. An MPEG-2 transport stream is a multiplex of a number of services, and a transmitter will typically transmit several transport streams to the set-top boxes. In turn, a suitably configured set-top box can tune to a specific transport stream and is then able to retrieve information from that transport stream.

When running an application that is retrieved directly from a live broadcast, the "application time" increases linearly. A user cannot jump back and forth in a live broadcast. When replaying a recorded application, however, the user can fast forward, or (fast) rewind the recording, but it is often the case that an application that has been written for linear playback cannot handle these fast forward and fast or conventional speed rewind (or more general, non-linear time) actions. Reasons for this include that an application can get events that are broadcast with an application, and the non-linear playback could result in missing such events or getting such events multiple times. Examples of such events are "Player X of football team Y has scored a goal"

It will be understood that it is possible to write applications that can work well in the context of non-linear time. The problem is that not all applications can be expected to be authored such that they do work well in the context of non-linear time.

It is accordingly an object of the present invention to provide a method for the handling of applications in non-linear time and a record/replay apparatus embodying such a method.

In accordance with a first aspect of the present invention there is provided a method for the handling of a recorded data stream and associated linear application, comprising:

commencing linear real-time playback of said data stream and commencing running of said linear application from a start point thereof;

on entering a non-linear playback phase, stopping running of said application; and on recommencing of linear real-time playback of said data stream, recommencing running of said linear application from said start point. By setting the application to restart when the data playback exits non-linear mode, for example at the conclusion of fast-forwarding through a passage of the stream, the problems of applications that cannot handle non-linear time are avoided.

Since some applications may be able to cope with certain non-linear operations, the application may not be stopped from running when playback of the recorded data stream enters a non-linear phase if a predetermined indication to this effect is detected in the recorded data stream. Furthermore, such predetermined indication suitably further identifies a subset of a larger number of possible non-linear playback activities as those for which the running of the application should not be stopped, with the running of the application being stopped when playback of the data stream in said non-linear phase involves an activity outside said subset.

To improve efficiency, where the running of the application requires loading and use of one or more resources, a check may be made prior to recommencing running as to whether said one or more resources are still loaded and, if so, using such pre-loaded resources. Furthermore, where the use of said one or more resources involves a verification procedure, such a procedure may be omitted on recommencing running if it is determined that said one or more resources are still loaded.

Also in accordance with the present invention there is provided a data playback apparatus for the handling of a recorded data stream and associated linear application, comprising:

storage means holding said recorded data stream and data defining said associated linear application;

a data stream playback stage operable to perform linear real-time and non-linear playback of said data stream from said storage means;

an application processing stage operable to read said data defining said associated linear application from said storage means and run said linear application from a start point thereof on commencement of linear real-time playback by said data stream playback stage;

the application processing stage being arranged, on entering of a non-linear playback phase by said data stream playback stage, to stop running of said application and on recommencing of linear real-time playback of said data stream, to recommence running of said linear application from said start point.

The data stream playback stage may be further operable to generate a menu display for output to a display device, with the apparatus further comprising user operable input means for identifying a selection from said menu to the apparatus. With such an arrangement, and where the application processing stage is operable to perform tasks other than stopping running of said application on the data stream playback stage entering said non-linear playback phase, the selection of one or more of such tasks may be made available to a user via said menu. The data stream playback stage may generate the menu on entering said non-linear phase.

Further features of the present invention will become apparent from reading of the following description of embodiments of the invention, given by way of example only, and with reference to the accompanying drawings in which.

Figure 1:
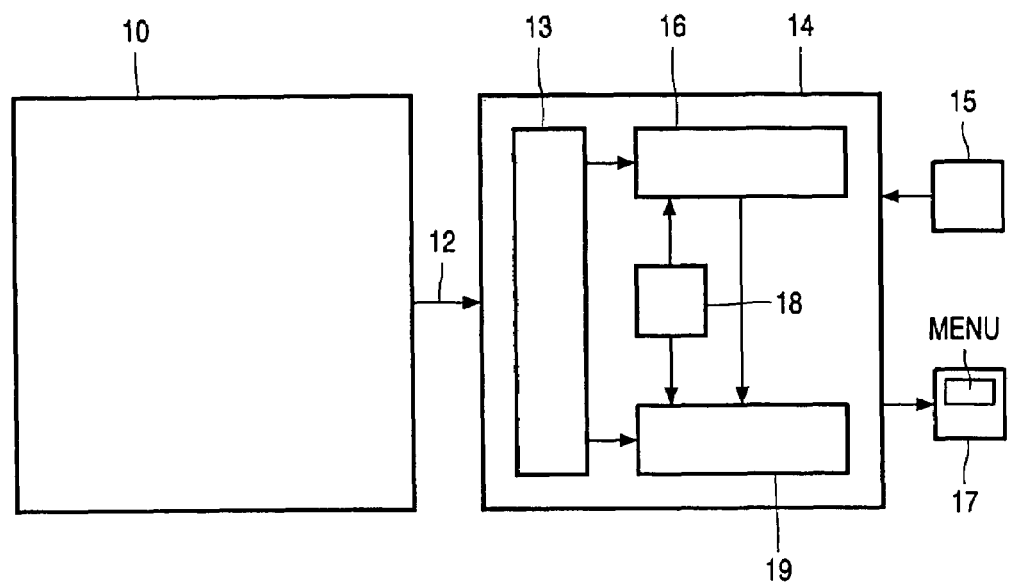
FIG. 1 shows a block diagram of a transmission system including a data recorder suitable to embody the invention.

FIG. 1 shows a block diagram of a transmission system suitable to embody the invention. In such a transmission system a number of multiplex signals 12 are transmitted by a transmitter 10 to a receiver and data storage device 14, which device may suitably be embodied as a domestic or professional quality video recorder apparatus.

The recorder 14 provides a first storage means 18, which may comprise video tape, optical or magnetic disc storage holding a recorded (video) data stream and data defining an associated linear application. A data stream playback stage 19 is operable to perform linear real-time and non-linear or trick-mode playback of said data stream from the storage means 18. An application processing stage 16 is also coupled with the storage means 18 and is operable to read the stored data defining the associated linear application and run said linear application from a start point thereof on commencement of linear real-time playback by the data stream playback stage 19.

In operation, as discussed in greater detail below, the application processing stage 16 is arranged, on entering of a non-linear playback phase by the data stream playback stage 19, to stop running of an application and on recommencing of linear real-time playback of said data stream, to recommence running of said linear application from said start point.

The user is enabled to control the receiver 14 by means of an input device 15, such as a keyboard or a remote control. The user can view the selected services and video on a display device 17 such as a domestic television receiver.

The multiplex signals 12 can be implemented in the form of MPEG-2 transport streams. An MPEG-2 transport stream is a multiplex of a number of so-called services. Such a service can contain an audio/video stream, an interactive application (for example in the MHEG-5 format), other kinds of data or a combination of these elements. Typically, a transmitter 10 transmits several transport streams 12 to the recorders 14. In this way, a large number of services (or channels) can be broadcast by the transmitter 10 to a plurality of recipients.

A receiver 13 of the recorder 14 can tune to a specific transport stream 12 and is then able to retrieve information from the transport stream 12. Such a recorder 14 typically has only one tuner and is thus merely able to receive a single transport stream 12 at a time. When a user wants to look at a television program, or wants to run an interactive application, or wants to access other kinds of data the recorder 14 tunes to the corresponding transport stream 12 and retrieves and/or processes the required data from the service as it is being broadcast at that moment.

Interactive applications such as Tele-banking, Tele-shopping or information services are typically broadcast in a carousel-like fashion, i.e. the therewith corresponding data sections are repeated periodically in the transport stream 12. For instance, both DVB and DAVIC have specified DSM-CC object carousels for broadcasting interactive applications.

Figure 2:
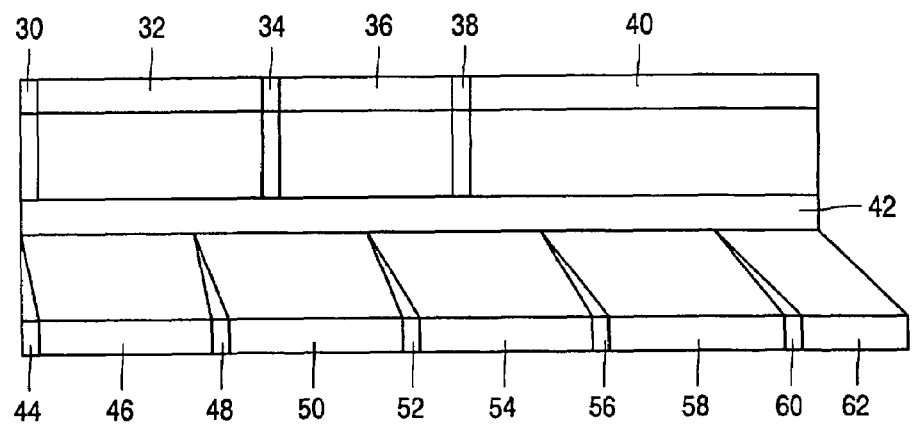
FIG. 2 shows schematically the layering used in DSM-CC object carousels.

In FIG. 2 the layered structure of DSM-CC object carousels is shown. The objects of a DSM-CC object carousel are broadcast in modules. Such a module is a container of objects and comprises a number of DownloadDataBlock messages (which are MPEG-2 private sections). In FIG. 2 module 42 comprises the objects 32, 36 and 40. These objects are included in so-called BIOP-messages. In such a BIOP-message the object is preceded by a message header. In FIG. 2 a first BIOP-message comprises a message header 30 and the object 32, which object 32 may include directory information. A second BIOP-message comprises a message header 34 and the object 36, which object 36 may include stream information. A third BIOP-message comprises a message header 38 and the object 40, which object 40 may include file information.

Furthermore, the module 42 comprises five DownloadDataBlock messages. These DownloadDataBlock messages consist of a header and a data block. The first DownloadDataBlock message is formed by header 44 together with data block 46, the second DownloadDataBlock message is formed by header 48 together with data block 50, the third by header 52 and data block 54, the fourth by header 56 and data block 58, and the fifth by header 60 and data block 62.

From the foregoing it may be seen how applications that do not work well in the context of non-linear time can still be used in the context of non-linear time by stopping and restarting the application. Applicants have recognised that this is often possible because applications will typically be authored such as to be able to be started in the middle of a television program because viewers can zap (channel switch) to the program after it has started. The signalling of an application in a transport stream always includes information about whether a program can (or even must) be started when the viewer zaps to the program in the middle of it.

The signalling (or meta-data) of an application can include informatin identifying whether an application can work well in the context of non-linear time. This signalling can include which particular non-linear time actions an application can handle and which not (e.g. fast forward is okay, fast rewind is not okay). Based on this information a multimedia platform can make the decision whether to stop and restart the application when the playback is non-linear. Examples of non-linear actions are: rewind, scan-backwards, slomo-backwards, still, pause, slomo (slow-motion) -forward, scan-forward, fast forward).

As indicated on display 17 in FIG. 1, a menu option may be supported for user-setting of the policy for how to handle non-linear applications. Possible options are "allow and restart the application", "disallow and keep application running", "show user dialog". The user dialog itself can appear when the user initiates a non-linear action. This user dialog can contain a warning that the non-linear action will result in restarting or killing the application and it can ask the user to confirm the non-linear action or to cancel it (so the application keeps running).

In operation, a restart in case of a non-linear playback action can be a "warm" restart. This means that all the resources (like application code and data) do not have to be reloaded, and re-verified for correctness. In particular for Java applications it implies that the class verifier (which can take considerable time) does not have to verify the class files again. This can speed up the restart considerably.

Reverting to FIG. 1, the applications are signalled in a table that is repetitively broadcast (e.g. once every second): this table is comparable to the Program Map Table (PMT) defined in the Systems part of the MPEG-2 standard, and the Service Description Table (SDT) defined in DVB-SI.

The table is part of a service and describes all of the available applications for that service. For each application, the table will indicate where it can be found in the object carousel, the name of the application, and a control code. The control code can, for instance, be AUTO_START (described below) or other options. If the control code at a particular point in time is AUTO_START, then it means that the recorder 14 must auto-start its receiver if it is tuned to the service, and must start the application (by 16) if it is not yet running. In particular, if the user zaps to the service—even in the middle of a program—and an application of that service is signalled as AUTO_START, then the receiver must start that application. This requires the application to have been authored such that it will work properly, even if started in the middle of a program.

The table carrying the application signalling is also a suitable recipient for the aforesaid data identifying whether (or to what extent) an application will work in non-linear time.

Regarding the presentation of user dialogue options and other menu data, the set-up menu of the recorder 14 may include an item along the lines of "Application Behaviour and Non-Linear Time" which, when selected, leads to options such as "Always allow non-linear playback and restart application"; "Always disallow non-linear playback"; and "Ask Me". If the user selects the "Ask Me" option, they will get a pop-up menu appearing when attempting to go into a non-linear action (for example selecting fast-forward on the video recorder). The pop-up menu may indicate "You selected fast-forward: this will result in the stopping and restarting of the application. Continue yes/no?". This option would, of course, only be presented for applications that do not work well in the context of non-linear time, but that can be stopped and restarted at any point in time.

Figure 3:
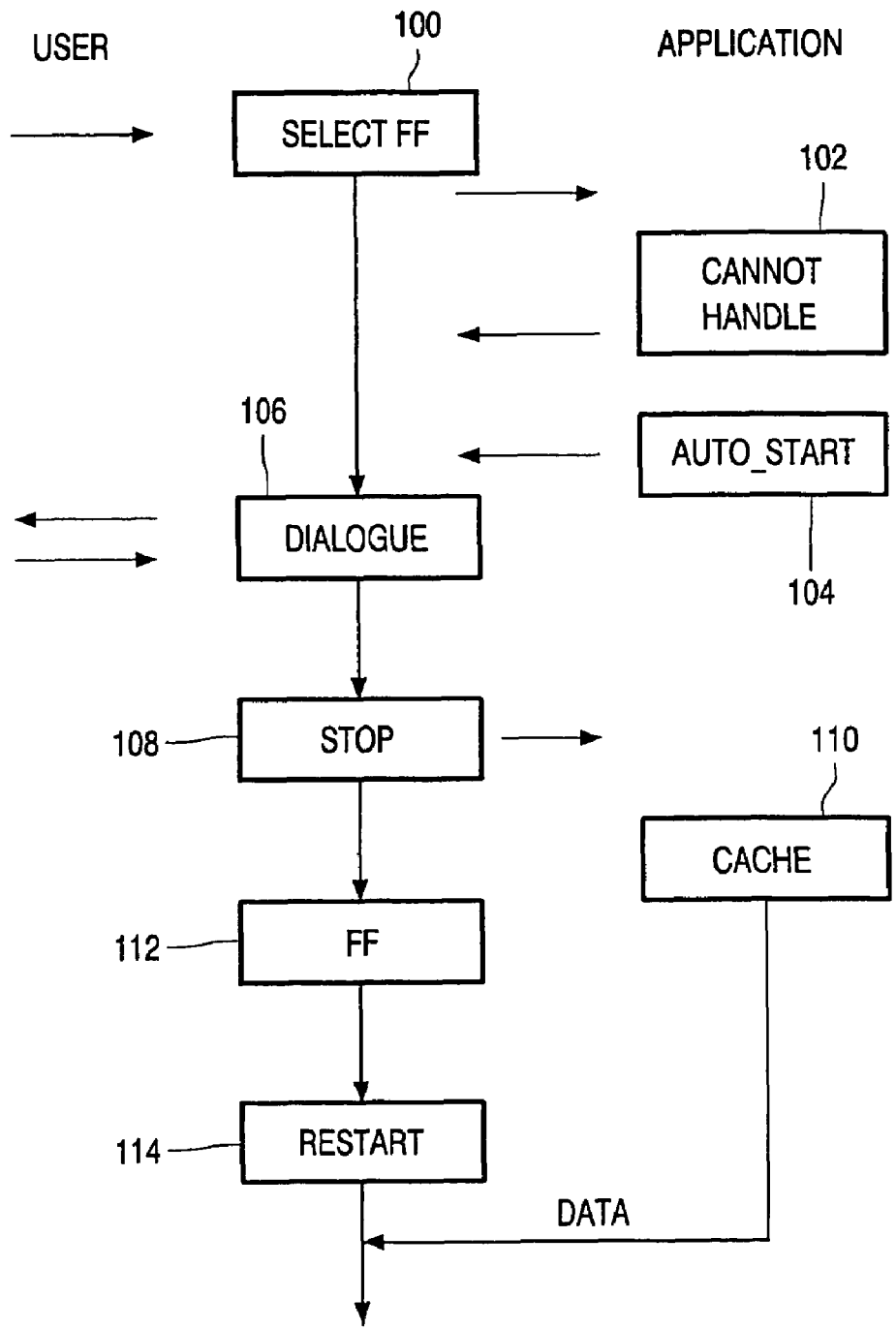
FIG. 3 is a flow-chart representing operations performed by the data recorder of FIG. 1.

The partial flow chart and schematic of FIG. 3 summarises the stop and restart process, commencing at 100 with the user selecting fast forwarding. The application is signalled and indicates at 102 that it cannot handle the non-linear action. The application further signals, at 104, that it is AUTO_START.

After an optional dialogue with the user at 106 (as described above) assuming a user decision to allow the fast forward, the application is stopped at 108 with data and settings cached at 110. Following the fast forwarding at 112, the application is restarted at 114 from that point in time, but with data and settings recovered from the cache.

The skilled reader will appreciate that, whilst the foregoing embodiments are described with reference to the MPEG-2 DSM-CC protocol, the invention is not limited to any specific protocol or form of data broadcast.

From reading the present disclosure, other modifications will be apparent to persons skilled in the art. Such modifications may involve other features which are already known in the design, manufacture and use of multimedia home platforms and applications and devices for incorporation therein and which may be used instead of or in addition to features already described herein.

The invention claimed is:

1. A method for the handling of a recorded data stream and associated linear application, comprising the acts of:
   commencing linear real-time playback of said data stream and commencing running of said linear application from a start point thereof;
   on entering a non-linear playback phase, stopping running of said application; and
   on recommencing of linear real-time playback of said data stream, recommencing running of said linear application from said start point; and
   providing a dialog box to a user containing a warning that the entering of the non-linear playback phase will result in restarting or killing the linear application.

2. The method as claimed in claim 1, wherein said application is not stopped from running when playback of the recorded data stream enters a non-linear phase if a predetermined indication to this effect is detected in the recorded data stream.

3. The method as claimed claim 1, wherein the running of said application requires loading and use of one or more resources, the method further comprising the acts of checking prior to recommencing running as to whether said one or more resources are still loaded and, if so, using said one or more resources which are still loaded.

4. The method as claimed in claim 3, wherein use of said one or more resources involves a verification procedure, wherein the verification procedure is not repeated on recommencing running if it is determined that said one or more resources are still loaded.

5. The method of claim 1, further comprising the act of receiving a confirmation from the user to enter the non-linear playback phase prior to the entering of the non-linear playback phase.

6. A method for the handling of a recorded data stream and associated linear application, comprising the acts of:
   commencing linear real-time playback of said data stream and commencing running of said linear application from a start point thereof;
   on entering a non-linear playback phase, stopping running of said application; and
   on recommencing of linear real-time playback of said data stream, recommencing running of said linear application from said start point;
   wherein said application is not stopped from running when playback of the recorded data stream enters a non-linear phase if a predetermined indication to this effect is detected in the recorded data stream, and
   wherein said predetermined indication further identifies a subset of a larger number of possible non-linear playback activities as those for which the running of the application should not be stopped, with the running of the application being stopped when playback of the data stream in said non-linear phase involves an activity outside said subset.

7. A data playback apparatus for the handling of a recorded data stream and associated linear application, comprising:
   storage means holding said recorded data stream and data defining said associated linear application;
   a data stream playback stage operable to perform linear real-time and non-linear playback of said data stream from said storage means;
   an application processing stage operable to read said data defining said associated linear application from said storage means and run said linear application from a start point thereof on commencement of linear real-time playback by said data stream playback stage;
   the application processing stage being arranged, on entering of a non-linear playback phase by said data stream playback stage, to stop running of said application and on recommencing of linear real-time playback of said data stream, to recommence running of said linear application from said start point; and
   means for providing a dialog box to a user containing a warning that the entering of the non-linear playback phase will result in restarting or killing the linear application.

8. The data playback apparatus as claimed in claim 7, wherein said data stream playback stage is further operable to generate a menu display for output to a display device, the apparatus further comprising user operable input means for identifying a selection from said menu to the apparatus.

9. The data playback apparatus as claimed in claim 8, wherein the application processing stage is operable to perform tasks other than stopping running of said application on the data stream playback stage entering said non-linear playback phase, with the selection of one or more of such tasks being made available to a user via said menu.

10. The data playback apparatus as claimed in claim 8, wherein said data stream playback stage generates said menu on entering said non-linear phase.

11. The data playback apparatus of claim 7, further comprising means for receiving a confirmation from the user to enter the non-linear playback phase and entering the non-linear playback phase in response to the confirmation.

12. A data playback apparatus for the handling of a recorded data stream and associated linear application, comprising:

means for commencing linear real-time playback of said data stream and commencing running of said linear application from a start point thereof;

on entering a non-linear playback phase, means for stopping running of said application; and on recommencing of linear real-time playback of said data stream, means for recommencing running of said linear application from said start point;

wherein said application is not stopped from running when playback of the recorded data stream enters a non-linear phase if a predetermined indication to this effect is detected in the recorded data stream, and wherein said predetermined indication further identifies a subset of a larger number of possible non-linear playback activities as those for which the running of the application should not be stopped, with the running of the application being stopped when playback of the data stream in said non-linear phase involves an activity outside said subset.

\* \* \* \* \*